March 7, 1933.　　　　E. R. EVANS　　　　1,900,546
BRAKE CONSTRUCTION
Filed March 30, 1928　　　3 Sheets-Sheet 1
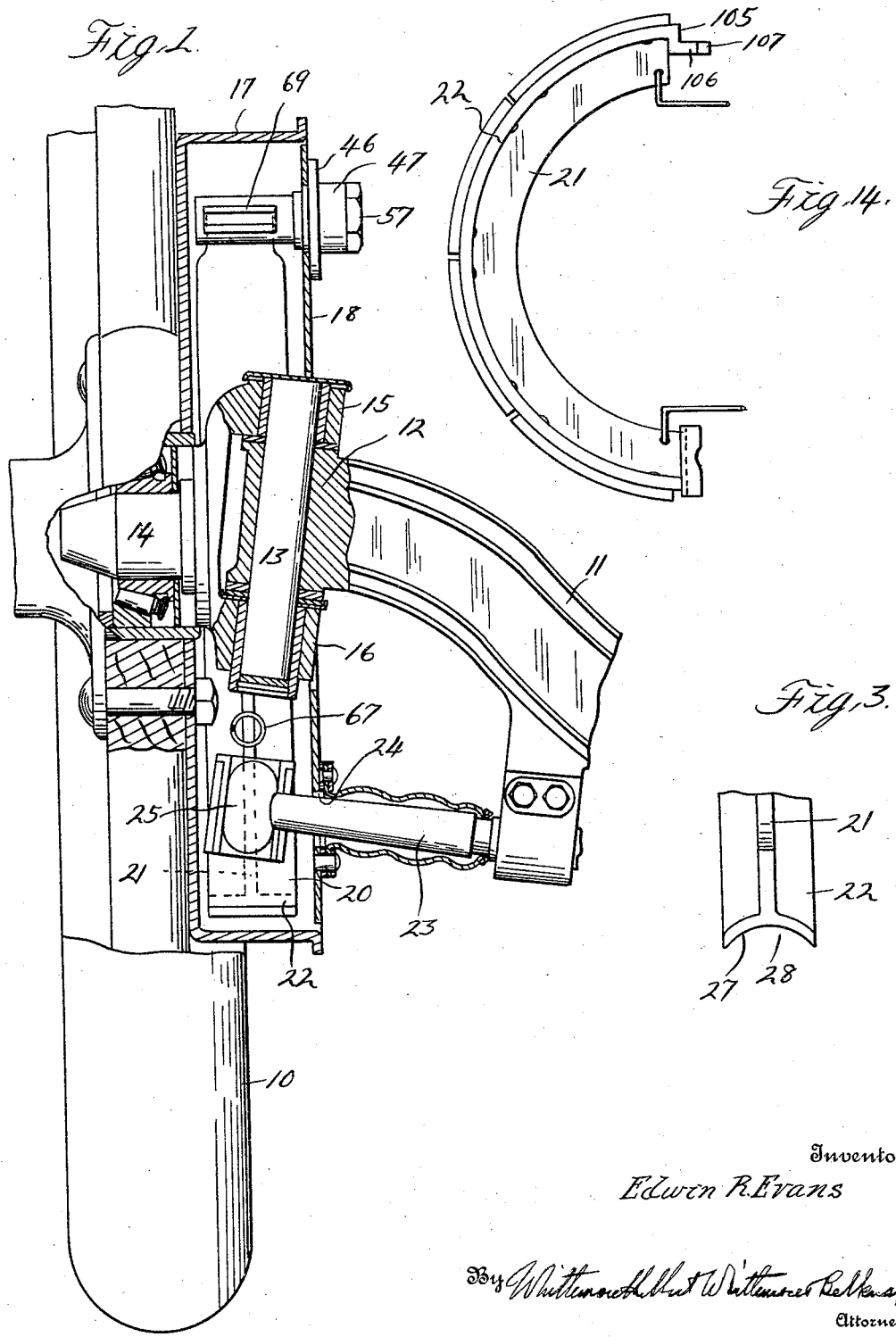
Inventor
Edwin R. Evans

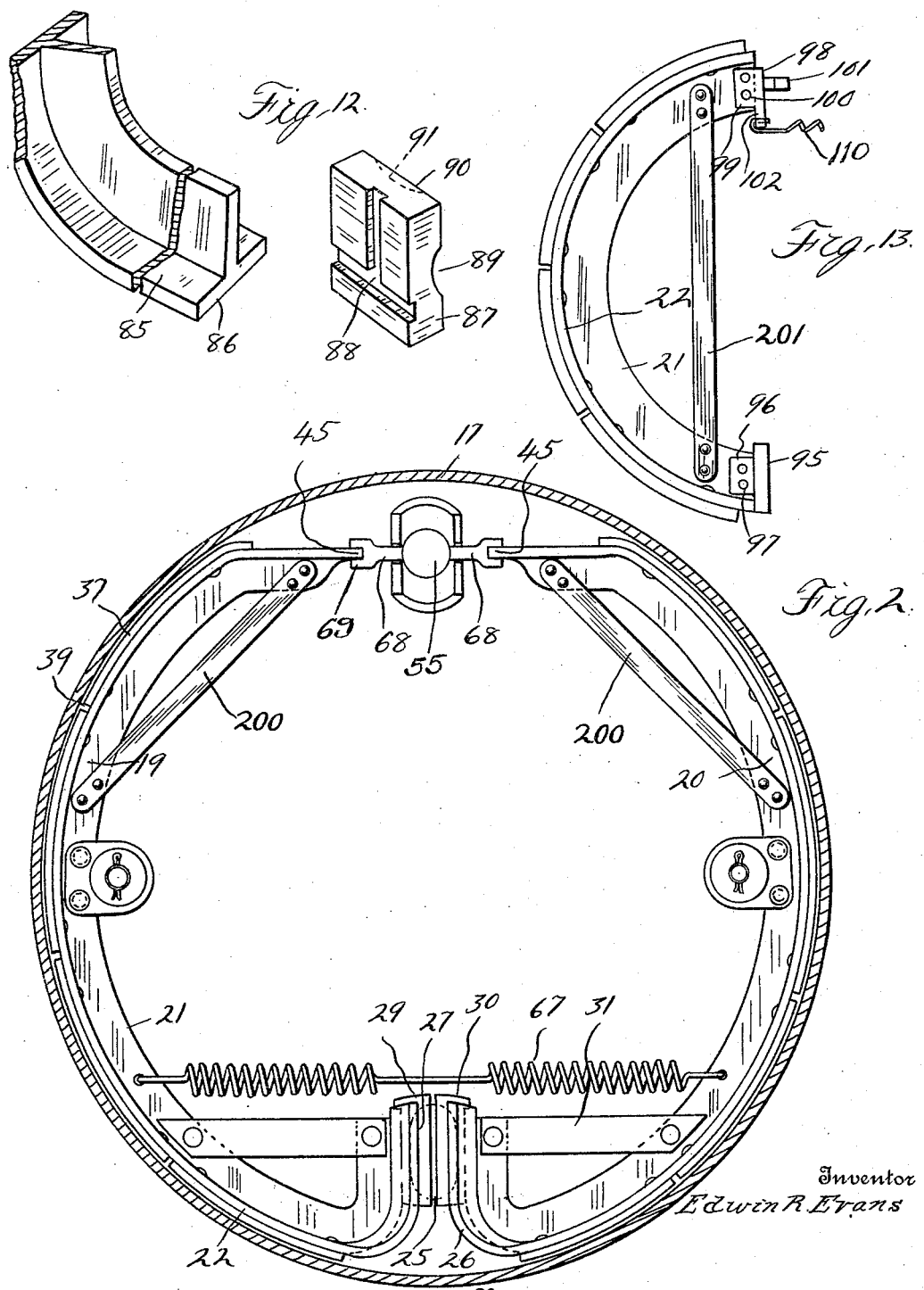

March 7, 1933.  E. R. EVANS  1,900,546
BRAKE CONSTRUCTION
Filed March 30, 1928  3 Sheets-Sheet 3
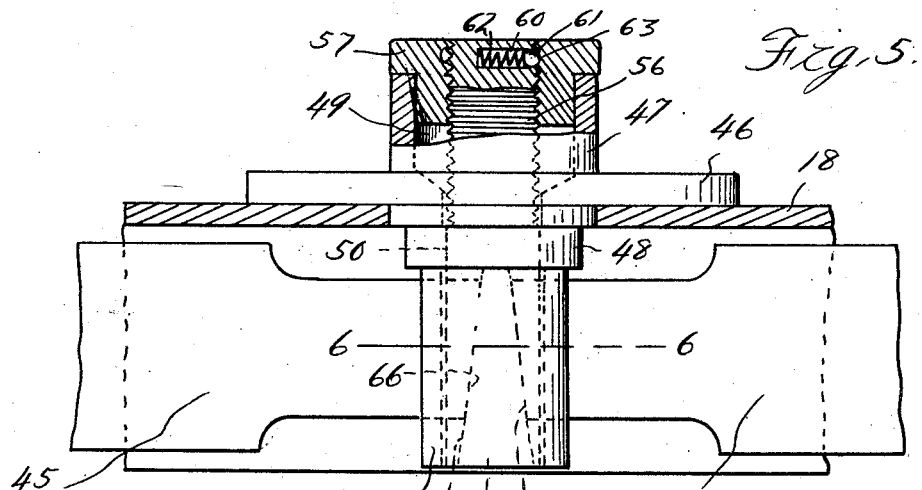
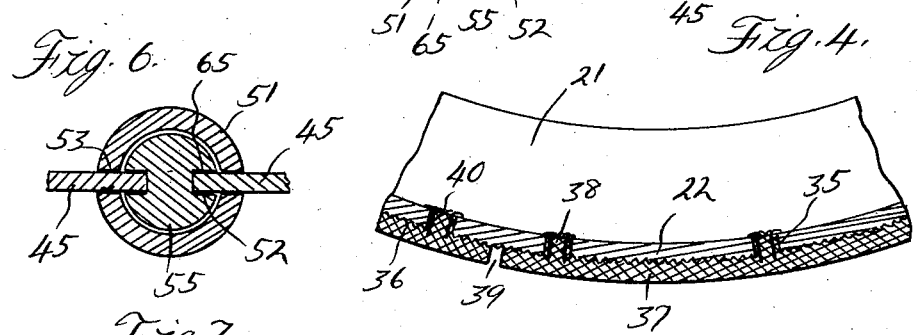
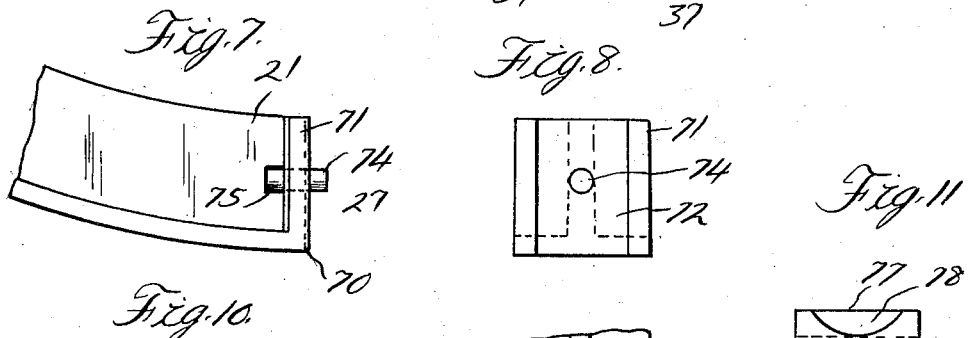
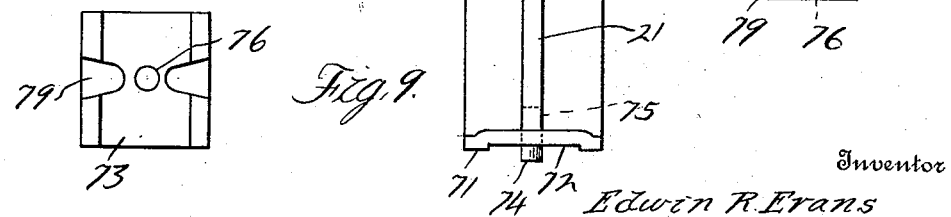
Inventor
Edwin R. Evans Patented Mar. 7, 1933

1,900,546

UNITED STATES PATENT OFFICE

EDWIN R. EVANS, OF DETROIT, MICHIGAN

BRAKE CONSTRUCTION

Application filed March 30, 1928. Serial No. 265,884.

This invention relates to brakes and has particular reference to a brake adapted for use in connection with the wheels of motor vehicles.

One of the objects of this invention is to simplify and render more efficient the wear plates or cam follower plates of the brake shoes and to provide novel means for securing these wear plates or cam follower plates to the brake shoes.

A further object of this invention is to provide a brake shoe which will be interchangeable, that is one which may be readily mounted on either side of any wheel on the vehicle.

Still another object of this invention is to provide a novel type of lining for the brake shoes and to provide a novel manner of attaching this lining to the brake shoes, and of preventing the lining from breaking loose.

Still another object of this invention is to provide novel means for anchoring and adjusting the brake shoes.

Still another object of the invention is to provide a brake construction wherein the brake shoes may be made of standard lengths, the invention contemplating the employment of bracing means for reinforcing shoes when the standard length shoes are employed for relatively large brakes.

Other objects and advantages of this invention will become apparent as the following description proceeds, particularly when reference is had to the accompanying drawings wherein:

Figure 1 is an elevational view partly in section showing the invention applied to a vehicle wheel;

Figure 2 is a detail elevational view of the brake drum and braking mechanism;

Figure 3 is a plan view of one end of the brake shoe shown in Figure 2;

Figure 4 is a fragmentary sectional view through one of the brake shoes;

Figure 5 is an elevational view partly in section of the shoe anchoring and adjusting mechanism;

Figure 6 is a sectional view taken substantially on the line 6—6 of Figure 5;

Figure 7 is an elevational view of one end of a slightly modified form of brake shoe;

Figure 8 is a front elevational view of the brake shoe shown in Figure 7;

Figure 9 is a fragmentary top plan view of the shoe shown in Figure 7;

Figure 10 is an elevational view of a wear plate adapted for attachment to the brake shoe shown in Figure 7;

Figure 11 is an end elevational view of the wear plate shown in Figure 10;

Figure 12 is a detail perspective view of another slightly modified form of brake shoe and wear plate adapted for attachment to the same;

Figure 13 is an elevational view of another modified form of brake shoe; and

Figure 14 is a view similar to Figure 13 showing still another form which the invention may assume.

Referring now particularly to the drawings wherein like reference characters designate corresponding parts throughout all views, 10 indicates one of the ground wheels of a motor vehicle. This wheel may be either a front or a rear wheel, since the brake constructed in accordance with this invention is adapted to be mounted on any ground engaging wheel of a vehicle. The wheel disclosed, however, is preferably a front wheel and 11 designates the front axle, which in accordance with the usual construction, is provided with a terminal bearing 12 adapted to receive the swivel pin 13. The wheel 10 is rotatable on the spindle 14, which spindle is provided with the upper and lower bearings 15 and 16 respectively for engagement with the opposite ends of the swivel pin 13.

Carried by the wheel 10 is a brake drum 17 and the inner portion of the drum is preferably closed by a cover plate 18 which is suitably mounted preferably by attachment to the bearings 15 and 16 so as to swivel with the wheel as a unit. The cover plate 18 serves not only to protect the brake shoes from dirt, but also serves as a support for the brake shoe adjusting mechanism hereinafter to be described.

Mounted within the brake drum 17 and adapted for movement into engagement with this brake drum, are the brake shoes 19 and 20 respectively. As clearly illustrated in Figure 2, each brake shoe is substantially semi-circular so that the two shoes, when combined, form a substantially circular brake surface adapted to engage practically the entire inner periphery of the brake drum 17.

Each brake shoe is substantially T-shaped in cross section the web of the T being indicated by the reference character 21 and the base of the T being indicated by the reference character 22. The brake shoes are adapted to be moved into engagement with the drum 17 by means of a cam shaft 23, which passes through an opening 24 in the cover plate 18 and which carries on its free end a cam head 25 adapted to engage suitable wear plates or cam follower plates, one of which is carried by one end of each brake shoe. As brought out before, it forms a part of this invention to simplify the construction of those ends of the brake shoes which are adapted to be engaged by the cam head 25. Accordingly, as clearly shown in Figures 2 and 3, each brake shoe is preferably bent upwardly, adjacent one end, as at 26 to form a substantially vertically extending end 27. The bases 22 of these ends 27 may then be slightly bent to form a recess 28 adapted to receive a bushing 29. As clearly shown in Figure 2 of the drawings, each bushing 29 is provided with a flange 30 adapted to seat on the upper edge of the end 27, whereby the bushings will be held firmly in place.

The cam head 25 is adapted to engage between the bushings 29 carried by adjacent ends of the brake shoes 19 and 20, so that upon a rotation of the cam shaft 23, the head 25 will be moved to force the bushings 29 and the brake shoes 19 and 20 away from each other. If desired, suitable bracing members 31 may connect the webs of the portions 27 with the webs of the substantially circular portions of the brake shoes to brace the ends 27 of the brake shoes. It will thus be seen that a simple and efficient structure will be formed on the ends of the brake shoes 19 and 20 for permitting spreading of these brake shoes by the cam head 25.

A further feature of this invention resides in the novel manner of applying the lining to each brake shoe. As clearly shown in Figure 4, the base 22 of each brake shoe is provided with a plurality of spaced apertures 35 and is serrated on its outer face as at 36. The lining 37 is formed of composition material and is molded on the base 22, during which molding operation, portions 38 of the lining will project into the apertures 35 to firmly lock the lining to the brake shoes. For preventing a breaking off of the portions 38, suitable ferrules 40 of copper or wire mesh may be first positioned in the apertures 35, and the lining then molded to enclose these ferrules. Thus the portions 38 will be strongly reinforced. Further by virtue of the serrations or corrugations on the outer face of the base 22, the lining 37 will be additionally secured to the brake shoes. The lining is molded in a plurality of sections, these sections being spaced from each other by the slots 39, whereby compensation may be made for the contraction and expansion of the lining incident to the use of the brake.

For anchoring and adjusting the brake shoes, there is provided the following structure. As clearly brought out before, the brake shoes are formed from T-bars and in order to connect the brake shoes to the adjusting mechanism, it is preferable to cut the web 21 of each brake shoe short of the base 22 thereof, in order that there may be provided a free end 45 on the base 22 of each brake shoe. These free ends 45 are adapted to have operative engagement with the adjusting mechanism about to be described.

As clearly shown in Figures 1 and 5 of the drawings, there is secured to the plate 18 at a point substantially diametrically opposite the cam head 25, a plate like member 46 provided on its outer face with a boss 47 and on its inner face with a boss 48 which projects through the plate 18. The boss 47 is provided with the counter-bore 49, which communicates at its inner end with an opening 50 formed through the boss 48. Extending from the boss 48 is a tubular portion 51 counterbored as at 52 to form an opening communicating with the opening 50 and provided with the diametrically opposed slots 53 through which the free ends 45 of the bases 22 are adapted to project, as clearly shown in Figures 5 and 6.

Slidably mounted in the opening 52 is a member 55 provided at its one end with a threaded portion 56. This threaded portion 56 is adapted to be received in the enlarged counter-bore 49, so as to be free from threaded engagement with the boss 47. A nut 57 threadedly engages the threaded end of the member 55 for adjusting the member 55 longitudinally through the opening 52. Obviously rotation of the nut 57 in one direction will tend to draw the member 55 outwardly, while rotation of the nut 57 in the other direction will permit longitudinal movement of the member 55 inwardly.

For affording a measured longitudinal adjustment of the member 55, this member is provided, adjacent the free end of its threaded portion with a radially arranged socket 60 adapted to receive a ball 61 urged outwardly by a spring 62. This ball is adapted to engage any one of a series of depressions 63 formed on the inner periphery of the nut 57 so that upon rotative movement of the nut or member 57, the ball 61 will successively enter these depressions 63 to indicate a measured rotation of the member or nut 57. Obviously rotation of the member 57 through a predetermined number of clicks, as caused by the successive engagement of the ball 61 in the depressions 63, will provide a predetermined rotational movement of the member 57 and longitudinal movement of the member 55.

For converting the longitudinal movement of the member 55 into lateral movement of the brake shoes, the body portion of the member 55 is provided with the diametrically opposed slots or grooves 65. These slots are tapered as clearly illustrated in Figure 5 of the drawings and are adapted to receive the ends 45 of the bases 22, which ends are tapered as at 66 to conform to the taper of the grooves or slots 65. Obviously, longitudinal outward movement of the member 55 will urge the ends 45 away from each other to force the brake shoes into engagement with the brake drum 17, while longitudinal adjustment of the member 55 inwardly will permit movement of the members 45 toward each other to permit the brake shoes to move away from the drum 17. For drawing the brake shoes toward each other when the member 55 is adjusted inwardly, there are provided the springs 67 in accordance with the usual practice.

If desired, the connection between the member 55 and the ends 45, may be accomplished as shown in Figure 2. In this form the member 55 is provided with the lateral extensions 68 adapted to project through the slots 53 of the extension 51, and the free ends of these extensions are bifurcated as at 69 to embrace the ends 45. The portion between the bifurcations may be tapered similar to the grooves 65 whereby movement of the member 55 will move the brake shoes in the same manner as brought out above.

From the above it is believed that the structure and operation of the anchoring and adjusting mechanism will be readily apparent. For adjusting the brake shoes relative to the drum, the cam head 25 is first turned to that position in which the brake shoes are permitted to most closely approach each other and the member 55 is then adjusted longitudinally outwardly to spread the shoes 19 and 20 until the same contact with the inner periphery of the brake drum. Each member 57 on each wheel is then rotated in the opposite direction a measured amount as indicated by the spring pressed ball 61, and the members 55 are forced inwardly in any desired manner until the member 57 contacts with the boss 47. This will release each set of brake shoes a measured amount, so that upon the actuation of the brakes mounted on the various wheels the braking forces will be applied uniformly.

In Figures 7, 8 and 9, 10 and 11 there is shown a slightly modified form of construction in which a hot pressed wear plate is adapted to be rigidly mounted on those ends of the shoes 19 and 20, which engage the cam head 25. In this form of construction one end of each brake shoe is bent upwardly as at 70 to form the vertically extending end 71. This end 71 is provided on its outer face with a recess 72 adapted to receive a wear plate or cam follower plate 73. A pin 74 is mounted substantially centrally of the end 71, this pin having its one end rigidly mounted as at 75 in a recess formed in the web 21 of the brake shoe. The opposite end of the pin 74 is adapted to be received in an aperture 76 formed in the wear plate 73. The wear plate may be welded to the pin 74 or secured to the same in any desired manner.

For the rear wheels of the vehicle, each wear plate may be provided with a plane face 77, while for the front wheels of the vehicle, each wear plate 73 may be provided on its front face with an arcuate recess 78. Further as clearly illustrated in Figure 10 of the drawings each wear plate is provided on its front face with the recesses 79, one of which is arranged on either side of the vertical median line of the wear plate to provide clearance for the cam shaft 23. By providing the recess 79 on both sides of the wear plate, the wear plate is adapted for use on either the right or left brake shoe, since the cam shaft 23 may be projected inwardly through either one recess or the other. It will thus be seen that by interchanging the wear plates 73 for the front or rear wheels, the brake shoes will be adapted for use with either the front wheels or rear wheels of the vehicle.

Obviously in this form of construction the cam head 25 is adapted to engage the wear plates 73 to move the ends of the brake shoes away from each other and to effect an engagement of the brake shoes 19 and 20 with the brake drum 17.

In Figure 12, there is shown another slightly modified form of construction. In this form of construction, each brake shoe is bent at its lower end to form a substantially horizontally arranged portion 85 and the free end 86 of each of these portions is preferably finished as by machining. Each wear plate or cam follower plate 87 is provided on one face with a T-shaped groove 88 adapted to receive the finished end 86 of its respective brake shoe. In assembling the wear plate with the brake shoe, the end 86 is inserted in the groove 88 and the members are then welded to each other or secured together in any desired way. In this manner, it will be found that a rigid construction will be formed which will readily withstand the constant thrust to which it is subjected during the actuation of the brake.

The wear plates 87 may be provided with the recesses 89 similar to the recesses 79 and may be provided with a plane face 90 for engagement with the cam head 25 or with the recess 91 shown in dotted lines, similar to the recess 78.

In Figure 13 there is shown still another slightly modified form of construction in which the web 21 of each brake shoe is cut off even at the end with the base 22. In this form of construction, the wear plate 95 is provided with the flange 96 which is adapted to be bolted or riveted to the web 21 as at 97. In this manner the wear plate 95 may be rigidly secured to the brake shoe and, if bolted, may be readily detached and replaced.

Further in this form of construction the ends 45 are eliminated and in their place an angle 98 provided with a flange 99 is bolted or riveted as at 100 to one end of the web 21. One leg 101 of the angle member 98 is adapted to be received in the grooves 65 in the member 55, while the other leg 102 of the angle member 98 is adapted to form an anchoring means for the spring 110. The ends 101 are tapered similar to the ends 45 and it is obvious that when these ends are engaged in the tapered grooves, longitudinal movement of the member 55 will move the shoes toward or away from each other.

In Figure 14, there is shown still another slightly modified form of construction in which base 22 of the brake shoe is extended beyond the web 21 and is bent downwardly as at 105, and then outwardly as at 106 to form the free end 107. This free end 107 is tapered similar to the end 45 of the form of construction shown in Figure 2, and is adapted to be received in the tapered groove 65 of the member 55. By bending the base 22 as above described, the force exerted by the longitudinal movement of the member 55 is transmitted directly to the webs 21 of the brake shoes to assure a positive adjustment of the brake shoes.

In order to strengthen and otherwise reinforce the brake shoes, braces such as illustrated at 200 in Figure 2 may be employed, or braces such as indicated at 201 in Figure 13 may be utilized. By providing means for reinforcing the brake shoes these shoes may be constructed in standard lengths and when used in connection with larger brakes employing larger brake drums, or at any time when reinforcing and strengthening is necessary, braces such as shown at 200 and 201 may be utilized. When the brake shoes are made from stampings considerable metal can be saved by making the webs narrower and providing the required rigidity by the use of either of the types of bracing members just hereinbefore described.

While several forms of the invention have been described somewhat in detail, it is to be clearly understood that the description of the invention is for the purposes of illustration only, and is not to be construed as definitive of the limits to which the invention may be applied. The right is therefore reserved to make such changes in the details of construction and arrangement of parts as will fall within the purview of the attached claims.

What I claim as my invention is:

1. A vehicle brake including in combination, a brake drum, a plurality of brake shoes, and means for adjusting said brake shoes relative to said brake drum, said means including a grooved member, and means for axially moving said grooved member.

2. A vehicle brake including in combination a member provided with a plurality of tapered grooves, and a pair of brake shoes having tapered ends engageable in the said grooves, whereby longitudinal movement of the said member effects an expansion or contraction of the said shoes.

3. A vehicle brake including in combination, a brake drum, a pair of brake shoes, each being provided with a tapered end, a member provided with tapered grooves adapted to receive the tapered ends of said shoes, and means for moving said member axially to force said shoes into engagement with said drum.

4. A vehicle brake including in combination, a brake drum, a pair of brake shoes, each being provided with a tapered end, a member provided with tapered grooves adapted to receive the tapered ends of said shoes, and means for moving said member axially to force said shoes into engagement with said drum, said means including a member rotatably mounted on said axially movable member and means for converting rotatable movement of said rotatable member into axial movement of said first mentioned member.

5. A vehicle brake including in combination, a brake drum, a pair of brake shoes, each being provided with a tapered end, a member provided with tapered grooves adapted to receive the tapered ends of said shoes, said member being movable to force said shoes into engagement with said drum and means for effecting a measured withdrawal of said shoes from engagement with said drum.

6. A vehicle brake including in combination, a brake drum, a pair of brake shoes, each being provided with a tapered end, a member provided with tapered grooves adapted to receive the tapered ends of said shoes, said member being movable to force said shoes into engagement with said drum and means for effecting a measured withdrawal of said shoes from engagement with said drum, said last mentioned means including a rotatable member, and a spring pressed member engageable with said rotatable member.

7. A vehicle brake including in combination a brake drum, a brake shoe and means for adjusting said brake shoe relative to said drum, said means including a member provided with a tapered groove, and an angle member secured to said brake shoe, said angle member having a tapered end adapted for engagement in said groove.

8. A vehicle brake including in combination a pair of T-shaped brake shoes, the base of each brake shoe being extended beyond the web at one end and being bent downwardly and then forwardly to form an extension beyond the end of each shoe, a member provided with a plurality of tapered grooves for receiving the extended ends of said brake shoes and means for axially moving said member.

9. An adjusting means for brake shoes comprising a grooved member with inclined surfaces at the bottom of the grooves.

10. An adjusting device for internal brake bands for motor vehicles comprising a grooved block having inclined surfaces in the grooves, the ends of the brake bands being located in the grooves and in engagement with the inclined surfaces, means attached to said block for moving the same for causing the inclined surfaces to move the brake bands outward, said means being operated from the outside of the enclosing housing of the bands.

11. In an internal brake mechanism, two brake bands each having inclined end surfaces which are spaced from each other, a grooved block with which the inclined ends engage, and means for moving the block for varying the space between the spaced ends of the bands.

12. In combination with a brake mechanism an anchor plate having an opening, a brake drum, a pair of shoes in the brake drum which are formed with inclined end surfaces, an adjusting device for the shoes comprising a member which is formed with grooves to receive the ends of the shoes, the grooves having inclined surfaces which correspond with the angle of inclination of the end surfaces of the shoes, said member extending through the opening in said anchor plate and means exterior of said anchor plate for slidably adjusting said member.

13. In a vehicle brake, a brake element having a tapered end, an anchor pin axially adjustable without rotation having an inclined groove to receive the tapered end of said element and a rotatable member on said pin for moving said pin to position said element.

14. In a vehicle brake, a pair of brake elements having oppositely tapered ends, an anchor pin axially adjustable without rotation having inclined grooves to receive the tapered ends of said element and a threaded nut on said pin for moving said pin to adjust the spacing between the ends of said elements.

15. In a vehicle brake, a fixed backing plate, a pair of brake shoes having oppositely tapered ends, a housing member fixed to said backing plate forming slots to receive the tapered ends of said shoes, a non-rotatable adjusting member guided for axial movement by said housing and having inclined grooves to receive the tapered ends of said shoes and a threaded adjusting element for moving said member axially to adjust the spacing between the ends of said brake shoes.

16. In a vehicle brake, a pair of brake shoes having oppositely tapered ends, a fixed backing plate having a housing to receive the ends of said brake shoes, a non-rotatable longitudinally adjustable member within said housing having inclined grooves to receive the tapered ends of said brake shoes and an adjusting nut on the exterior of said backing plate engageable with said adjustable member and bearing against said housing to adjust the spacing between the ends of said shoes upon rotation thereof.

17. In a vehicle brake, a brake element having a tapered end, a fixed backing plate having a housing rigid with respect thereto, said housing being adapted to receive the tapered end of said brake element, a slidable adjustable anchor member received by said housing having an inclined groove to receive the tapered end of said element and rotatable means operable with the brake drum in place for moving said member to adjust the position of said brake element.

18. In a vehicle brake, a brake drum, a fixed backing plate having a housing rigid therewith, a pair of brake elements having oppositely tapered ends and adapted to be expanded into engagement with said brake drum, said tapered ends being received by said housing, a slidable adjustable anchor member within said housing having inclined grooves to receive the tapered ends of said brake elements and rotatable means operable with the brake drum in place for sliding said member to adjust the spacing between the ends of said brake element.

19. In a vehicle brake, a rotatable brake drum, a fixed backing plate, a pair of brake shoes substantially T-shaped in cross section, an operating cam between one pair of ends of said shoes, an adjustable anchor pin between the other pair of ends of said shoes, the ends of said shoes which engage with said anchor being flattened and tapered, said anchor pin having inclined grooves to receive the tapered ends of said shoes and rotatable means exterior of said backing plate for slidably moving said anchor pin to adjust the spacing between the ends of said brake shoes.

20. In a vehicle brake, a rotatable brake drum, a fixed backing plate having a housing rigid therewith, a pair of semi-circular brake shoes substantially T-shaped in cross section, an operating cam between one pair of ends of said shoes and an adjustable anchor pin supported by said housing between the other pair of ends of said shoes, the ends of said shoes which engage with said anchor pin being flattened and having inclined end surfaces, said anchor pin having correspondingly inclined grooves, the ends of said shoes being adapted to extend through said housing in thrust engagement with the grooves in said anchor pin and an adjusting nut exterior of said backing plate for slidably moving said anchor pin to adjust the spacing between the ends of said brake shoes.

21. In a vehicle brake, a brake drum, a backing plate, a pair of brake elements carried by the backing plate adapted to be expanded into engagement with the brake drum, an adjustable anchor between spaced ends of said brake elements, said anchor having grooves inclined radially to the axis of adjustment adapted to cooperate for expanding said brake elements upon adjustment of said anchor, resilient means holding said brake elements in thrust engagement with said anchor, said anchor being accessible for adjustment without removal of the brake drum.

22. In an apparatus of the class described, a brake drum, a pair of brake shoes mounted in said drum, ends of said shoes directed inwardly from the brake drum periphery, means resiliently urging the corresponding ends of said shoes toward each other, means interposed between one such pair of ends and adapted to cause separation thereof, and means supporting the other pair of ends in spaced relation, said last-named means comprising a pin mounted in a support and extending between said last-named shoe ends, said pin being threaded on its outer end, and being provided with substantially oppositely-opening slots, the bases of said slots being equally and oppositely cammed, said last-named shoe ends entering said respective slots, and means for operating said pin to vary the distance between said last-named shoe ends.

23. In an apparatus of the class described, a brake drum, a pair of brake shoes mounted in said drum, means resiliently urging the corresponding ends of said shoes toward each other, means interposed between one such pair of ends and adapted to cause separation thereof, and means supporting the other pair of ends in spaced relation, said last-named pair of ends being spaced inwardly from the brake drum periphery, said last-named means comprising a pin mounted in a support on an axis perpendicular to the plane of said shoes and extending between said last-named shoe ends, said pin being threaded on its outer end, and being provided with substantially oppositely-opening longitudinal slots, the bases of said slots being equally and oppositely cammed, cams on said last-named shoe ends entering said respective slots, and means for reciprocating said pin to vary the distance between said last-named shoe ends.

24. In combination with a pair of brake shoes having beveled inturned corresponding ends, a pin interposed between said ends and formed with oppositely opening longitudinal slots in its surface, said ends entering said slots, and the bases of said slots being equally and oppositely cammed, and means for reciprocating said pin.

In testimony whereof I affix my signature.
EDWIN R. EVANS.